United States Patent
D'Souza

(10) Patent No.: US 10,002,129 B1
(45) Date of Patent: Jun. 19, 2018

(54) SYSTEM AND METHOD FOR EXTRACTING INFORMATION FROM UNSTRUCTURED TEXT

(71) Applicant: Wipro Limited, Bangalore (IN)

(72) Inventor: Shaun Cyprian D'Souza, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days. days.

(21) Appl. No.: 15/474,194

(22) Filed: Mar. 30, 2017

(30) Foreign Application Priority Data

Feb. 15, 2017 (IN) .............................. 201741005343

(51) Int. Cl.
*G06F 17/00* (2006.01)
*G06F 17/27* (2006.01)

(52) U.S. Cl.
CPC .......... *G06F 17/278* (2013.01); *G06F 17/277* (2013.01); *G06F 17/271* (2013.01)

(58) Field of Classification Search
CPC ... G06F 17/2705; G06F 17/271; G06F 17/278
USPC ........................................................ 704/9
See application file for complete search history.

(56) References Cited

U.S. PATENT DOCUMENTS

| 7,475,010 | B2 | 1/2009 | Chao | |
|---|---|---|---|---|
| 2010/0063796 | A1* | 3/2010 | Rehberg | G06F 17/2785 704/9 |
| 2010/0228693 | A1* | 9/2010 | Dawson | G06F 17/2705 706/12 |
| 2014/0032209 | A1 | 1/2014 | Etzioni et al. | |
| 2014/0297264 | A1 | 10/2014 | Etzioni et al. | |
| 2015/0356463 | A1* | 12/2015 | Overell | G06F 17/278 706/12 |

FOREIGN PATENT DOCUMENTS

WO       2015080561 A1      6/2015

* cited by examiner

*Primary Examiner* — Daniel Abebe
(74) *Attorney, Agent, or Firm* — LeClairRyan PLLC

(57) ABSTRACT

This disclosure relates generally to natural language processing, and more particularly to a system and method for extracting subject-verb-object (SVO) chunked text from an unstructured text. In one embodiment, a method is provided for extracting SVO chunked text from an unstructured text. The method comprises identifying a plurality of part of speech (PoS) tokens in the unstructured text, and determining a plurality of SVO chunked text directly from the plurality of PoS tokens using a machine learning chunker model. The machine learning chunker model is trained on a subject-verb-object (SVO) annotated training data.

15 Claims, 5 Drawing Sheets

SYSTEM AND METHOD FOR EXTRACTING INFORMATION FROM UNSTRUCTURED TEXT

This application claims the benefit of Indian Patent Application Serial No. 201741005343, filed Feb. 15, 2017, which is hereby incorporated by reference in its entirety.

FIELD

This disclosure relates generally to natural language processing, and more particularly to system and method for extracting subject-verb-object (SVO) chunked text from an unstructured text.

BACKGROUND

Natural language text has been a fundamental means of representing human knowledge and understanding. In an increasingly digital world, there is an exponential growth in readily accessible text. The web contains vast repositories of unstructured text. Many a times, finding relevant information is challenging. Information extraction (IE) is a task of automatically extracting structured information from unstructured and/or semi-structured text. The extracted information may be used in a variety of semantic web applications such as authoring ontologies via web ontology language (OWL), modeling information using resource description framework (RDF), question answering (QA), and so forth.

IE systems typically extract a set of subject-verb-object (SVO) triples for use in knowledge gathering and integration. Thus, the knowledge is represented in the triples format. In most of the cases, the extracting the set of triples involves processing natural language texts by means of natural language processing (NLP). The processing includes extracting tokens (i.e., words or phrases), identifying part of speech (PoS) for each tokens, and chunking PoS tokens. Chunking is typically used in shallow parsing of text and groups PoS tokens into sequences of syntactically related words. These include groups of noun phrase, verb phrase, adjective phrase, and so forth. As will be appreciated, the availability of a larger set of NLP tools such as OpenNLP has made it possible to PoS tag and chunk vasts amount of unstructured text available on the Internet. Additionally, projects like ClueWeb, OpenIE, and Wikipedia provide a corpus of text data which may be used for ontological engineering. A knowledge graph representing an unstructured text source may provide additional logical and inference functionality. Further, it should be noted that the PoS tag data provides better language inference and understanding as compared to a bag of words approach of web scale unstructured data.

There are various IE techniques to extract SVO triples from the unstructured data. For example, DBpedia extractor is employed to generate a set of triples from Wikipedia using annotated field information in Wikipedia. Further, ClauseIE system uses a dependency parser to output a set of word triples. Further, OpenIE system (e.g., REVERB, R2A2, etc.) uses PoS tagger and chunker model followed by rules based engine to output a set of word triples. The OpenNLP chunker model is used to chunk noun phrase (NP), verb phrase (VP) and prepositional phrases (PP) from the PoS tagged text received from the PoS tagger. The chunker data (i.e., chunked text) is then fed to a rule-based relationship extractor and a rule-based argument extractor that employ a set of rules to extract a set of triples. The extracted triples consist of left and right argument phrases from the input sentence and a relation phrase (predicate) from the input sentence, and is in the format (argument 1; relation; argument 2). The relation phrases expresses a relation between the argument phrases. The REVERB uses shallow syntactic processing to identify relation phrases that begin with a verb and occur between the argument phrases.

Thus, the current techniques employs PoS data, chunker data, and parser data as input, and a set of heuristics to determine a set of triples, thereby resulting in an additional overhead on extraction efficiency. Additionally, a rule based engine is typically employed when there is a lack of labeled data. The rule based systems have the drawback that they are designed around the set of heuristics. Further, the set of rules have to be developed and updated manually.

SUMMARY

In one embodiment, a method for extracting subject-verb-object (SVO) chunked text from an unstructured text is disclosed. In one example, the method comprises identifying a plurality of part of speech (PoS) tokens in the unstructured text. The method further comprises determining a plurality of SVO chunked text directly from the plurality of PoS tokens using a machine learning chunker model. The machine learning chunker model is trained on a subject-verb-object (SVO) annotated training data.

In one embodiment, a system for extracting subject-verb-object (SVO) chunked text from an unstructured text is disclosed. In one example, the system comprises at least one processor and a memory communicatively coupled to the at least one processor. The memory stores processor-executable instructions, which, on execution, cause the processor to identify a plurality of part of speech (PoS) tokens in the unstructured text. The processor-executable instructions, on execution, further cause the processor to determine a plurality of SVO chunked text directly from the plurality of PoS tokens using a machine learning chunker model. The machine learning chunker model is trained on a subject-verb-object (SVO) annotated training data.

In one embodiment, a non-transitory computer-readable medium storing computer-executable instructions for extracting subject-verb-object (SVO) chunked text from an unstructured text is disclosed. In one example, the stored instructions, when executed by a processor, cause the processor to perform operations comprising identifying a plurality of part of speech (PoS) tokens in the unstructured text. The operations further comprise determining a plurality of SVO chunked text directly from the plurality of PoS tokens using a machine learning chunker model. The machine learning chunker model is trained on a subject-verb-object (SVO) annotated training data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
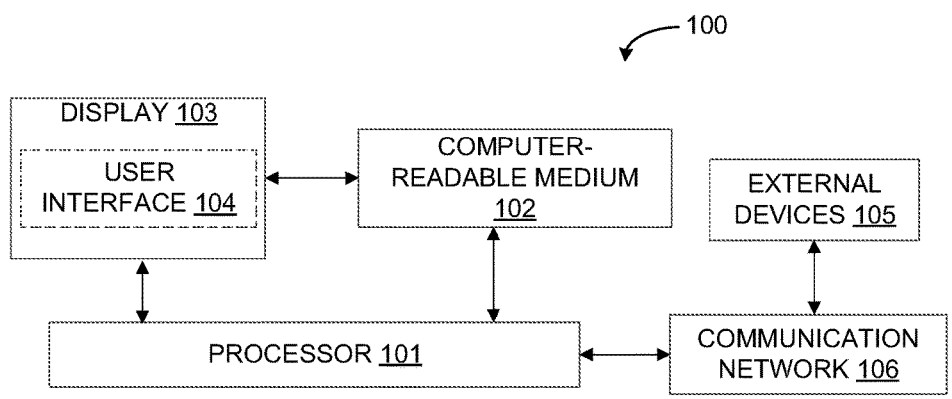
FIG. 1 is a block diagram of an exemplary system for extracting subject-verb-object (SVO) chunked text from an unstructured text in accordance with some embodiments of the present disclosure.

Referring now to FIG. 1, an exemplary system or subject-verb-object (SVO) chunked text computing device 100 for extracting SVO chunked text from an unstructured text is illustrated in accordance with some embodiments of the present disclosure. In particular, the system 100 implements a SVO chunked text extraction engine for extracting SVO chunked text. As will be described in greater detail in conjunction with FIG. 2, the SVO chunked text extraction engine comprises multiple modules configured to process input data so as to extract SVO chunked text. The SVO chunked text extraction engine identifies a plurality of part of speech (PoS) tokens in the unstructured text, and determines a plurality of SVO chunked text directly from the plurality of PoS tokens using a machine learning chunker model. The machine learning chunker model is trained on a SVO annotated training data.

The system 100 comprises one or more processors 101, a computer-readable medium (e.g., a memory) 102, and a display 103. The computer-readable storage medium 102 stores instructions that, when executed by the one or more processors 101, cause the one or more processors 101 to extract SVO chunked text in accordance with some embodiments of the present disclosure. For example, the computer-readable storage medium 102 may store set of instructions for identifying a plurality of part of speech (PoS) tokens in the unstructured text, and determining a plurality of SVO chunked text directly from the plurality of PoS tokens using a machine learning chunker model corresponding to PoS tagging module, and chunker module respectively. Additionally, the computer-readable storage medium 102 may store set of instructions for training the machine learning chunker model on a subject-verb-object (SVO) annotated training data corresponding to chunker model training module. The one or more processors 101 may fetch the instructions from the computer-readable storage medium 102 via a wired or wireless communication path, and execute them to extract SVO chunked text.

The computer-readable storage medium 102 may also store various data (e.g., input text, tokens, PoS tags for tokens, SVO annotated training data, chunker model, chunked data, SVO chunked text, and so forth) that may be captured, processed, and/or required by the system 100. The system 100 interacts with a user via a user interface 104 accessible via the display 103. The system 100 may also interact with one or more external devices 105 over a wired or wireless communication network 106 for sending or receiving various data. The external devices 105 may include, but are not limited to, a remote server, a digital device, or another computing system.

Figure 2:
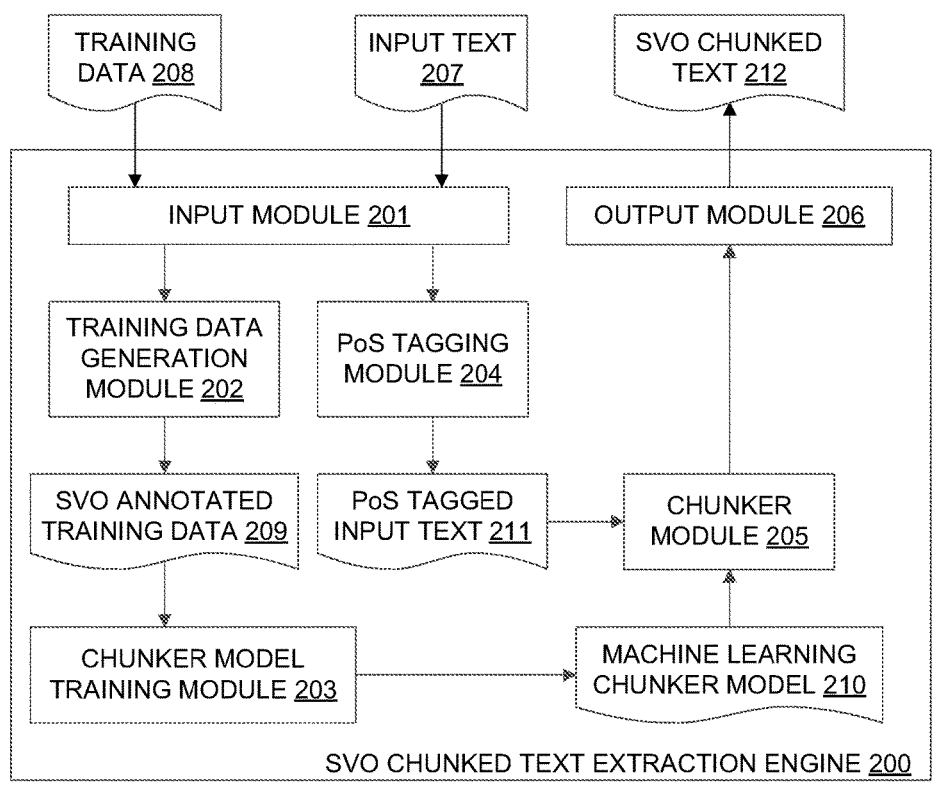
FIG. 2 is a functional block diagram of a SVO chunked text extraction engine in accordance with some embodiments of the present disclosure.

Referring now to FIG. 2, a functional block diagram of the SVO chunked text extraction engine 200 implemented by the system 100 of FIG. 1 is illustrated in accordance with some embodiments of the present disclosure. The SVO chunked text extraction engine 200 may include various modules that perform various functions so as to extract SVO chunked text from an unstructured text. In some embodiments, the SVO chunked text extraction engine 200 comprises an input module 201, a training data generation module 202, a chunker model training module 203, a PoS tagging module 204, a chunker module 205, and an output module 206.

The input module 201 receives an input text 207 from one or more data sources. The one or more data sources may include, but are not limited to, a user (e.g., end user, a trainer, etc.), an application (e.g., Adobe Acrobat, BOT's, MS Word, Internet Explorer, etc.), or any other connected system (e.g., enterprise resource planning (ERP) system, customer relationship management (CRM) system, any other computing system, etc.). It should be noted that, in some embodiments, the input text 207 may be unstructured text sourced from the Internet. In some embodiments, the input text 207 from different sources may be standardized prior to being fed into the SVO chunked text extraction engine 200. Alternatively, in some embodiments, the input module 201 may standardize the input text 207 received from different sources. The input text 207 is subsequently processed by the PoS tagging module 204 and the chunker module 205 to extract the SVO chunked text.

Additionally, the input module 201 receives training data 208 from one or more data sources. The one or more data sources may include a user (e.g., a trainer, an end user), an application (e.g., MS excel, MS access, etc.), and any other connected system (e.g., any other computing system, etc.). In some embodiments, the training data 208 may be structured text such as CoNLL training data which is used by a training data generation module 202 to generate a SVO annotated training data 209, which in turn is used by the chunker model training module 203 to train a machine learning chunker model 210. Alternatively, in some embodiments, the training data 208 may be the SVO annotated training data which may be directly used by the chunker model training module 203 to train the machine learning chunker model 210.

In some embodiments, the SVO annotated training data 209 comprises train data as well as test data of three columns. The first column comprises a number of tokens (i.e., the words or phrases), the second column comprises a number of PoS tags corresponding to the tokens, and the third column comprises a number of SVO tags or chunk tags corresponding to the tokens. The PoS tags include, but are not limited to, a noun (NN), a personal pronoun (PRP), an adjective (JJ), a verb (VB), an adverb (RB), a preposition (IN), a modal (MD), and a determiner (DT). The SVO tags include, but are not limited to, a subject phrase (SUBJECT), a verb phrase or a predicate phrases (VERB or PREDICATE), and an object phrase (OBJECT). Thus, the training data 208 is grouped into semantic groups of subject phrase (SUBJECT), predicate phrase (PREDICATE), and object phrase (OBJECT). In some embodiments, the SVO tags also include an overlapping phrase that may be an object phrase as well as a subject phrase (OBJECTSUBJECT). Additionally, in some embodiments, the SVO tags may be in beginning-inside-other (BIO) format indicating if the token occurs at a beginning of a chunk, inside of the chunk, or other. By way of example, in some embodiments, exemplary SVO annotated training data 209 in BIO format and comprising of SUBJECT, PREDICATE, and OBJECT is provided in Table A below:

TABLE A

| Sample Number | Token | PoS Tag | SVO Tag |
|---|---|---|---|
| 1 | He | PRP | B-SUBJECT |
|  | reckons | VBZ | B-PREDICATE |
|  | the | DT | B-OBJECT |
|  | current | JJ | I-OBJECT |
|  | account | NN | I-OBJECT |
|  | deficit | NN | I-OBJECT |
|  | will | MD | O |
|  | narrow | VB | O |
|  | to | TO | O |
|  | only | RB | O |
|  | # | # | O |
|  | 1.8 | CD | O |
|  | billion | CD | O |
|  | in | IN | O |
|  | September | NNP | O |
|  | . | . | O |
| 2 | He | PRP | O |
|  | reckons | VBZ | O |
|  | the | DT | B-SUBJECT |
|  | current | JJ | I-SUBJECT |
|  | account | NN | I-SUBJECT |
|  | deficit | NN | I-SUBJECT |
|  | will | MD | B-PREDICATE |
|  | narrow | VB | I-PREDICATE |
|  | to | TO | B-OBJECT |
|  | only | RB | I-OBJECT |
|  | # | # | I-OBJECT |
|  | 1.8 | CD | I-OBJECT |
|  | billion | CD | I-OBJECT |
|  | in | IN | I-OBJECT |
|  | September | NNP | I-OBJECT |
|  | . | . | O |

By way of another example, in some embodiments, exemplary SVO annotated training data 209 in BIO format and comprising of SUBJECT, PREDICATE, OBJECT, and OBJECTSUBJECT is provided in Table B below:

TABLE B

| Sample Number | Token | PoS Tag | SVO Tag |
|---|---|---|---|
| 1 | He | PRP | B-SUBJECT |
|  | reckons | VBZ | B-PREDICATE |
|  | the | DT | B-OBJECTSUBJECT |
|  | current | JJ | I-OBJECTSUBJECT |
|  | account | NN | I-OBJECTSUBJECT |
|  | deficit | NN | I-OBJECTSUBJECT |
|  | will | MD | B-PREDICATE |
|  | narrow | VB | I-PREDICATE |
|  | to | TO | B-OBJECT |
|  | only | RB | I-OBJECT |
|  | # | # | I-OBJECT |
|  | 1.8 | CD | I-OBJECT |
|  | billion | CD | I-OBJECT |
|  | in | IN | I-OBJECT |
|  | September | NNP | I-OBJECT |
|  | . | . | O |

The training data generation module 202 generates the SVO annotated training data 209 in a pre-defined format from the training data 208. In some embodiments, the SVO annotated training data 209 is generated using the CoNLL training data and in a CoNLL three columns format. In some embodiments, the SVO annotated training data 209 is generated based on span information corresponding to the tokens in the training data. Thus, for each of a number of PoS tagged tokens in each of a number of syntactically related PoS tokens in each of a number of sentences in a training text, the training data generation module 202 detects a span information for a given PoS token, and tags the PoS token as a SUBJECT, a PREDICATE or a VERB, or an OBJECT based on the span information. Additionally, in some embodiments, the training data generation module 202 tags the PoS token as an OBJECTSUBJECT based on the span information and a pervious tagging of the PoS token as the OBJECT. Thus, the training data generation module 202 generate a SVO annotated training data file (svo-chunker-train.dat file), which is then used to train the machine learning chunker model 210.

The chunker model training module 203 receives the SVO annotated training data 209 from the training data generation module 202, and trains the machine leaning chunker model 210 based on the SVO annotated training data 209 in accordance with some embodiments of the present disclosure. Alternatively, in some embodiments, the chunker model training module 203 receives the SVO annotated training data 209 directly from the input module 201, and trains the machine leaning chunker model 210 based on the SVO annotated training data 209 in accordance with some embodiments of the present disclosure. The chunker model training module 203 uses supervised learning to train the machine learning chunker model 210, which in turn enables the chunker module 205 to predict a set of labels in the PoS tagged input text 211. In some embodiments, the chunker model training module 203 trains the machine leaning chunker model 210 on a non-overlapping SVO annotated training data comprising one set of subject, verb, and object in each of the sentences. Additionally, in some embodiments, the chunker model training module 203 trains the machine leaning chunker model 210 on an overlapping SVO annotated training data comprising one or more sets of subject, verb, object, and objectsubject in each of the sentences.

Thus, in some embodiments, the machine learning chunker model 210 may be trained on training data comprising non-overlapping contiguous chunks. The tokens in the training dataset is chunk tagged as SUBJECT, PREDICATE, or OBJECT if it is found to be in the span of the triples entry. Additionally, the training data used may contain a single triple per sentence. However, in a typical sentence there may be overlapping contiguous chunks of object phrase and subject phrase where a number of object phrases may overlap with subsequent subject phrases. Further, a typical sentence may contain more than one triples. Therefore, in some embodiments, the machine learning chunker model 210 may be trained on training data comprising overlapping contiguous chunks. The tokens in the training dataset is chunk tagged as SUBJECT, PREDICATE, OBJECT, or OBJECTSUBJECT if it is found to be in the span of the triples entry. As will be appreciated, in addition to the SUBJECT, PREDICATE and OBJECT chunks, the additional chunk OBJECTSUBJECT detects overlapping contiguous chunks of object and subject. Additionally, the training data used may contain more than one triples per sentence, and the machine learning chunker model 210 may be trained on all extracted triples per sentence in the training data. This results in a substantially higher precision and recall of extractions for the machine learning chunker model 210 while extracting SVO chunked text from the PoS tagged input text 211. The SVO chunked text is semantically related groups of tokens and comprises a verb phrase and at least two of a subject phrase, an object phrase, and an objectsubject phrase chunks. In other words, the SVO chunked text is SVO triples annotated text. The Further, the machine learning chunker model 210 is able to annotate multiple extractions in a line of text.

By way of example, in some embodiments, exemplary training text, corresponding SVO annotated training data, and SVO chunked text is provided in Table C below. The SVO annotated training data 209 such as one provided in Table C is used to train the machine learning chunker model 210. Thus, the typical training data is updated to SVO annotated training data and use SVO chunks for training. In some embodiments, the machine learning chunker model 210 is trained to generate a SVO chunker model binary file (en-chunker-svo.bin file), which is then used to extract SVO chunked text from the PoS tagged input text 211.

TABLE C

| | |
|---|---|
| Training Text | He reckons the current account deficit will narrow to only # 1.8 billion in September. |
| SVO Annotated Training Data | [SUBJECT He_PRP ] [PREDICATE reckons_VBZ ] [OBJECTSUBJECT the_DT current_JJ account_NN deficit_NN ] [PREDICATE will_MD narrow_VB ] [OBJECT to_TO only_RB #_# 1.8_CD billion_CD in_IN September_NNP ]._. |
| SVO Chunked Text | ("He", "reckons", "the current account deficit") ("the current account deficit", "will narrow", "to only # 1.8 billion in September") |

The PoS tagging module 204 receives input text 207 from input module 201, and identifies a plurality of part of speech (PoS) tokens in the input text 207 so as to generate PoS tagged input text 211. In some embodiment, the PoS tagging module 203 extracts a number of tokens from the input text 207, and determines a PoS tag for each of the tokens. It should be noted that the each of the tokens includes a word or a phrase in the input text. The tokens along with their corresponding PoS tags are the PoS tokens or the PoS tagged input text 211.

The chunker module 205 determines a number of SVO chunked texts 212 directly from the PoS tokens 211 using a machine learning chunker model 210. In other words, the chunker module 205 groups the POS tagged text into semantically related groups of tokens rather than the syntactically related groups. As discussed above, the machine learning chunker model 210 is trained on the SVO annotated training data 209. The machine learning chunker model 210 therefore directly extracts or annotates all the subject-predicate-object chunks in the PoS tagged input text 211.

The output module 206 receives the SVO chunked texts 212 from the chunker module 205 and renders the same to the user or the computing system for subsequent use. By way of example, in some embodiments, exemplary input text, corresponding SVO annotated text, and corresponding SVO chunked text is provided in Table D below:

TABLE D

| | |
|---|---|
| Input Text | Confidence in the pound is widely expected to take another sharp dive if trade figures for September, due for release tomorrow, fail to show a substantial improvement from July and August's near-record deficits. But analysts reckon underlying support for sterling has been eroded by the chancellor's failure to announce any new policy measures in his Mansion House speech last Thursday. This has increased the risk of the government being forced to increase base rates to 16% from their current 15% level to defend the pound, economists and foreign exchange market analysts say. |
| SVO Annotated Text | [SUBJECT Confidence_NNP in_IN the_DT pound_NN ] [PREDICATE is_VBZ widely_RB expected_VBN to_TO take_VB ][OBJECT another_DT sharp_JJ dive_NN if_IN] [OBJECTSUBJECT trade_NN figures_NNS for_IN September_NNP] [SUBJECT ,_, due_JJ for_IN release_NN tomorrow_NN ] ,_, [PREDICATE fail_VBP to_TO show_VB ] [OBJECT a_DT substantial_JJ improvement_NN from_IN July_NNP and_CC August_NNP 's_POS ] near-record_JJ deficits_NNS ._. But_CC [SUBJECT analysts_NNS ] [PREDICATE reckon_VBP ] [OBJECTSUBJECT underlying_JJ support_NN for_IN sterling_NN ] [PREDICATE has_VBZ been_VBN eroded_VBN ] [OBJECT by_IN the_DT chancellor_NN 's_POS ] failure_NN to_TO announce_VB any_DT new_JJ policy_NN measures_NNS in_IN his_PRP$ Mansion_NNP House_NNP speech_NN last_JJ Thursday_NNP ._. [SUBJECT This_DT ][PREDICATE has_VBZ increased_VBN ] [OBJECT the_DT risk_NN of_IN ] [OBJECTSUBJECT the_DT government_NN ] [PREDICATE being_VBG forced_VBN to_TO increase_VB ] [OBJECT base_NN rates_NNS to_TO 16_CD %_NN from_IN their_PRP$ current_JJ 15_CD %_NN level_NN ] to_TO defend_VB the_DT pound_NN ,_, economists_NNS and_CC foreign_JJ exchange_NN market_NN analysts_NNS say_VBP ._. |
| SVO Chunked Text | ("Confidence in the pound", "is widely expected to take", "another sharp dive if trade figures for September") ("trade figures for September , due for release tomorrow", "fail to show", "a substantial improvement from July and August's") ("analysts", "reckon", "underlying support for sterling") ("underlying support for sterling", "has been eroded", "by the chancellor's") ("This", "has increased", "the risk of the government") ("the government", "being forced to increase", "base rates to 16% from their current 15% level") |

As will be appreciated, the SVO chunked text extraction engine 200 determines the SVO chunked text 212 directly from the PoS tagged input text 211 without extracting any relationship, or without extracting arguments for the extracted relationship. Further, as will be appreciated, the SVO chunked text extraction engine 200 determines SVO chunked text (i.e., SVO triples annotated text) rather than just SVO triples. Thus, contrary to current OpenIE techniques such as Reverb, the SVO chunked text extraction engine 200 does not identify a relation predicate for extracting SVO triples. Further, contrary to current information extraction (IE) techniques, the SVO chunked text extraction engine 200 does not use set of rules or heuristics to determine sequences of noun and verb phrases in the PoS tagged text to detect SVO triples. The SVO chunked text extraction engine 200 only employ the OpenNLP utilities (e.g., for PoS tagging, and for chunking the text) to output SVO chunked text 212 unlike current techniques which employ a set of utilities in addition to the OpenNLP utilities. In other words, the SVO chunked text extraction engine 200 eliminates the need for post chunker processing employed by the current techniques.

Further, as will be appreciated, in a sentence, it may be sufficient to bootstrap identify the subject phrase chunk. The objectsubject phrase chunk enables in the identification of a large number of subject phrase chunks that may have been otherwise missed in an overlapping contiguous chunks of object and subject. In other words, the OBJECTSUBJECT tag enables identification of the next subject phrase within the sentence comprising the overlapping contiguous chunks. Thus, there is substantial improvement in the number of extractions using the OBJECTSUBJECT tag. The OBJECT-SUBJECT tag enables annotation of multiple contiguous triples in a text sentence. Additionally, the chunker feature set was able to identify all subsequent predicate and object chunks accurately. This is independent of identifying a prior predicate relation phrase.

Moreover, as will be appreciated, the SVO chunked text extraction engine 200 is more efficient than alternative IE techniques. For example, the chunker module 205 implements the machine learning chunker model 210 to directly extract SVO chunked text 212 from the PoS tagged text 211. Such machine learning models are enabled by data, are trainable and adaptable, and reduce the amount of manual effort required. Further, the machine learning chunker model 210 results in a substantially higher precision and recall of extractions for number of correct extractions as well as an about par extractions for total number of extractions while extracting SVO chunked text from the PoS tagged input text 211.

As will be appreciated by those skilled in the art, all such aforementioned modules and submodules may be represented as a single module or a combination of different modules. Further, as will be appreciated by those skilled in the art, each of the modules may reside, in whole or in parts, on one device or multiple devices in communication with each other.

Further, as will be appreciated by one skilled in the art, a variety of processes may be employed for extracting SVO chunked text from an input text. For example, the exemplary system 100 may extract SVO chunked text from an input text by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
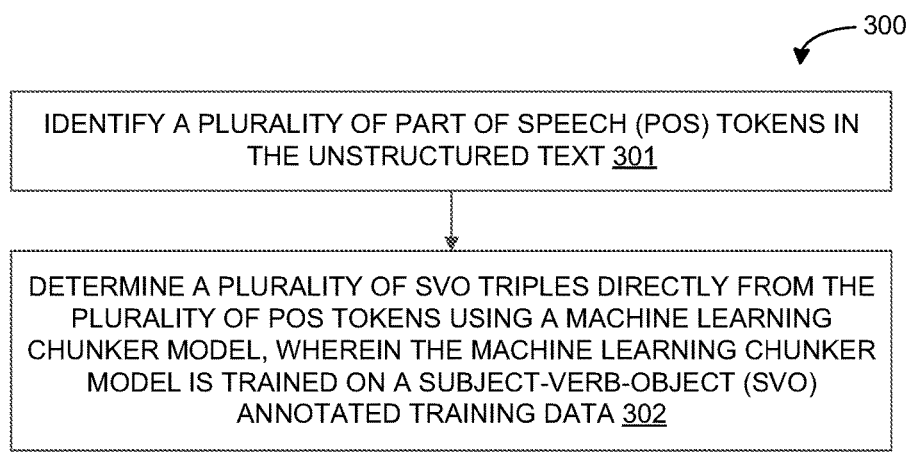
FIG. 3 is a flow diagram of an exemplary process for extracting SVO chunked text from an unstructured text in accordance with some embodiments of the present disclosure.

For example, referring now to FIG. 3, exemplary control logic 300 for extracting SVO chunked text from an unstructured text via a system, such as system 100, is depicted via a flowchart in accordance with some embodiments of the present disclosure. As illustrated in the flowchart, the control logic 300 includes the steps of identifying a plurality of part of speech (PoS) tokens in the unstructured text at step 301, and determining a plurality of SVO chunked text directly from the plurality of PoS tokens using a machine learning chunker model at step 302. The machine learning chunker model is trained on a subject-verb-object (SVO) annotated training data.

In some embodiments, identifying the plurality of PoS tokens at step 301 comprises extracting a plurality of tokens from the input text, and determining a PoS tag for each of the plurality of tokens. Each of the plurality of tokens comprises a word or a phrase. Additionally, in some embodiments, each of the plurality of SVO chunked text is a set of semantically related PoS tokens. Further, in some embodiments, each of the plurality of SVO chunked text comprises a verb phrase and at least two of a subject phrase, an object phrase, and an objectsubject phrase. The objectsubject phrase corresponds to an overlapping contiguous chunks that is an object phrase in an initial part of a sentence and a subject phrase in the subsequent part of the sentence.

In some embodiments, the SVO annotated training data comprises a plurality of tokens, a plurality of corresponding PoS tags, and a plurality of corresponding SVO tags. The plurality of corresponding SVO tags comprises a subject tag, a verb tag, an object tag, and an objectsubject tag. Additionally, in some embodiments, the plurality of corresponding SVO tags is in beginning-inside-other (BIO) format. Further, in some embodiments, the SPO annotated training data is generated based on a plurality of corresponding span information for the plurality of tokens.

Figure 4:
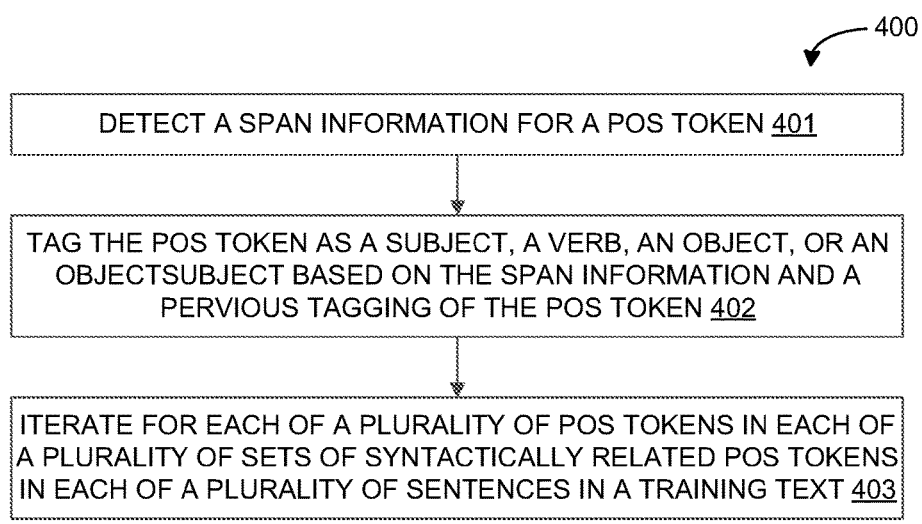
FIG. 4 is a flow diagram of an exemplary process for generating SVO annotated training data in accordance with some embodiments of the present disclosure.

Referring now to FIG. 4, exemplary control logic 400 for generating SVO annotated training data via a system, such as system 100, is depicted via a flowchart in accordance with some embodiments of the present disclosure. As illustrated in the flowchart, the control logic 400 includes the steps of detecting a span information for a PoS token at step 401, and tagging the PoS token as a subject, a verb, an object, or an objectsubject based on the span information and a pervious tagging of the PoS token at step 402. The control logic 400 further includes the step of iterating the steps 401 and 402 for each of a plurality of PoS tokens in each of a plurality of sets of syntactically related PoS tokens in each of a plurality of sentences in a training text or training data.

Referring back to FIG. 3, in some embodiments, the machine learning chunker model is trained on a non-overlapping SVO annotated training data comprising one set of subject, verb, and object in each of the sentences. Additionally, in some embodiments, the machine learning chunker model is trained on an overlapping SVO annotated training data comprising one or more sets of subject, verb, object, and objectsubject in each of the sentences. As will be appreciated, the machine learning chunker model determine the plurality of SVO chunked text directly from the plurality of PoS tokens without a set of heuristics or without a set of rules.

Figure 5:
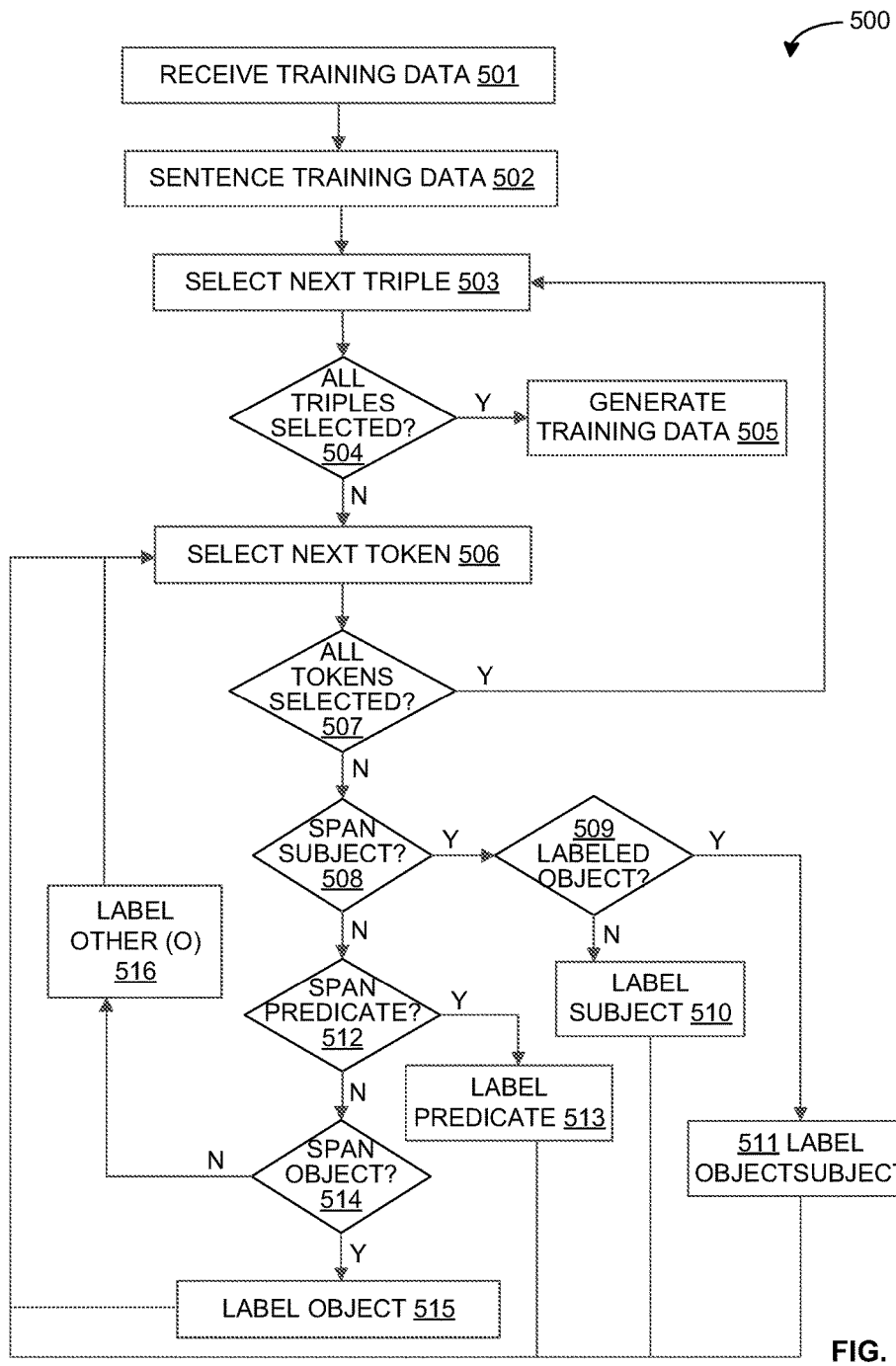
FIG. 5 is a flow diagram of a detailed exemplary process for generating SVO annotated training data in accordance with some embodiments of the present disclosure.

Referring now to FIG. 5, exemplary control logic 500 for generating SVO annotated training data is depicted in greater detail via a flowchart in accordance with some embodiments of the present disclosure. As illustrated in the flowchart, the control logic 500 includes the step of receiving training data at step 501. The training data is a structured data containing a sentence, its POS tags, the obtained triples, and the span information corresponding to each triple in the sentence. In some embodiments, the training data is provided in a comma separated values (.csv) formatted file. The .csv file comprises sentence information (i.e., a record of the sentence, its POS tags, and the triples extraction) and span information corresponding to the triple (i.e., subject, predicate, and object). It should be noted that, in some embodiments, a parser (e.g., OpenNLP parser, n-array tree search, etc.) may be employed in extraction of the triples and span information corresponding to each triple. The extracted triples and the span information corresponding triples may be updated in the .csv file as a line record.

The control logic 500 further includes the steps of obtaining training data for each sentence from the training data at step 502, and selecting a triple from the sentence training data at step 503. The control logic 500 further includes the step of determining if all the triples in the sentence have been selected at step 504. If all the triples have been selected at step 504, the control logic 500 includes the step of generating SVO annotated training data at step 505. However, if all the triples have not been selected at step 504, the control logic 500 includes the step of selecting a PoS token from the selected triple at step 506. The control logic 500 further includes the step of determining if all the tokens in the selected triple have been selected at step 507. If all the tokens have been selected at step 507, the control logic 500 flows back to step 503 where next triple is selected from the sentence.

However, if all the tokens have not been selected at step 507, the control logic 500 includes the step of detecting span information for the selected token and determining if the selected token maps in the span of a SUBJECT token at step 508. If the selected token maps in the span of the SUBJECT token at step 508, the control logic 500 includes the step of determining if the selected token was previously labeled as an OBJECT token at step 509. If the selected token was not previously labeled as the OBJECT token at step 509, then the control logic 500 includes the step of labelling the selected token as the SUBJECT token at step 510. However, if the selected token was previously labeled as the OBJECT token at step 509, then the control logic 500 includes the step of labelling the selected token as an OBJECTSUBJECT token at step 511.

Further, if the selected token does not map in the span of the SUBJECT token at step 508, the control logic 500 includes the step of determining if the selected token maps in the span of a PREDICATE token at step 512. If the selected token maps in the span of the PREDICATE token at step 512, the control logic 500 includes the step of labelling the selected token as the PREDICATE token at step 513. However, if the selected token does not map in the span of the PREDICATE token at step 512, the control logic 500 includes the step of determining if the selected token maps in the span of the OBJECT token at step 514. If the selected token maps in the span of the OBJECT token at step 514, the control logic 500 includes the step of labelling the selected token as the OBJECT token at step 515. However, if the selected token does not map in the span of the OBJECT token at step 514, the control logic 500 includes the step of labelling the selected token as other (O) at step 516. Once the selected token has been labelled as one of the SUBJECT at step 510, the OBJECTSUBJECT at step 511, the PREDICATE at step 513, the OBJECT at step 515, or the OTHER (O) at step 516, the control logic 500 flows back to step 506 where next token is selected from the selected triple.

Thus, for each sentence, the control logic 500 obtains a triple in the sentence. The control logic 500 then iterates over all the tokens in the sentence to detect token span information. The token is labeled as SUBJECT, PREDICATE or OBJECT if it is found to be in the span of a triples entry. However, if a token with an OBJECT chunk is found to map in the span of a SUBJECT token, it is retagged as OBJECTSUBJECT. Further, the control logic 500 iterates over all the triples in the sentence relabeling the word tokens as per the span information. After all the sentence triples have been processed, the control logic 500 outputs the SVO annotated (i.e., SVO labeled) training data comprising the tokens, the corresponding POS tags, and the corresponding chunk tags. In some embodiments, the SVO annotated training data may be generated in the CoNLL three columns format comprising tokens, corresponding POS tags, and corresponding BIO format chunk tags as provided in Table A and Table B. The received training data (i.e., training text) is therefore divided into semantic groups of subject phrase (SUBJECT), predicate phrase (PREDICATE), object phrase (OBJECT), and objectsubject phrase (OBJECTSUBJECT). As stated above, the OBJECTSUBJECT tag detects overlapping chunk phrases in the text, thereby enabling continuity in annotation of the triples chunks.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the technology. When implemented on a microprocessor, the computer program code segments configure the microprocessor to create specific logic circuits.

As will be appreciated by those skilled in the art, the techniques described in the various embodiments discussed above provide for robust and efficient mechanism to extract SVO chunked text (i.e., SVO triples annotated text) from an unstructured text. The techniques employ a supervised machine learning chunker model to carry out triples annotation in a document by predicting a set of semantic SVO labels corresponding to the chunker output, thereby eliminating the need for a rule based or a heuristic based approach to extract SVO triples from the chunked data. In other words, the techniques described in the various embodiments discussed above eliminate the need for post chunker processing while extracting SVO chunked text. Additionally, the machine learning chunker model enables high precision and high recall of extractions and is therefore more efficient than alternative approaches.

Further, as will be appreciated by those skilled in the art, the supervised machine learning (ML) chunker model may be trained to extract semantic SVO triples annotated text from the unstructured text using a SVO annotated training data. The techniques described in the various embodiments discussed above provide for generation of SVO annotated training data by transforming training data for triples in a sentence into SVO semantic groups in a predefined format, such as CoNLL three columns format, if it is found to be in the span of the triples entry. Additionally, multiple triples in the same sentence may be mapped to a single entry in the SVO annotated training data. Further, an additional OBJECTSUBJECT tag may be defined to annotate overlapping contiguous chunks of object and subject, thereby enabling continuity in annotation of multiple chunk triples in a sentence.

Further, the techniques described in the various embodiments discussed above may enable efficient development of an application platform for generation of SVO triples annotated text in text data. Additionally, the techniques may be deployed in a scalable manner on a host of platforms running OpenNLP. For example, the techniques may be used and implemented in open information extraction.

The specification has described system and method for extracting SVO chunked text from an unstructured text. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for extracting subject-verb-object (SVO) chunked text from unstructured text, the method comprising:
   identifying, by a SVO chunked text computing device, a plurality of part of speech (PoS) tokens in an unstructured text; and
   determining, by the SVO chunked text computing device, a SVO chunked text directly from the plurality of PoS tokens using a machine learning chunker model, wherein the machine learning chunker model is trained on an SVO annotated training data, wherein the SVO annotated training data comprises a plurality of tokens, a plurality of corresponding PoS tags, and a plurality of corresponding SVO tags, the plurality of corresponding SVO tags comprises one or more of a subject tag, a verb tag, an object tag, or an object-subject tag, and the plurality of corresponding SVO tags is in beginningin-side-other (BIO) format, and wherein the SVO annotated training data is generated based on a plurality of corresponding span information for the plurality of tokens by for each of a plurality of PoS tokens in each of a plurality of sets of syntactically related PoS tokens in a sentence, detecting a span information for a PoS token and tagging the PoS token as a subject, a verb, an object, or an object-subject based on the span information and a pervious tagging of the PoS token.

2. The method of claim 1, wherein identifying the plurality of PoS tokens comprises:
   extracting a plurality of tokens from the input text, wherein each of the plurality of tokens comprises a word or a phrase; and
   determining a PoS tag for each of the plurality of tokens.

3. The method of claim 1, wherein each of the plurality of SVO chunked text is a set of semantically related PoS tokens and comprises a verb phrase and at least two of a subject phrase, an object phrase, or an object-subject phrase and the object-subject phrase corresponds to an overlapping contiguous chunks that is an object phrase in an initial part of a sentence and a subject phrase in the subsequent part of the sentence.

4. The method of claim 1, wherein the machine learning chunker model is trained on one or more of:
   a non-overlapping SVO annotated training data comprising one set of subject, verb, and object in each of the sentences; or
   an overlapping SVO annotated training data comprising one or more sets of subject, verb, object, and object-subject in each of the sentences.

5. The method of claim 1, wherein the machine learning chunker model determines the plurality of SVO chunked text directly from the plurality of PoS tokens without a set of heuristics or a set of rules.

6. A subject-verb-object (SVO) chunked computing device, comprising:
   at least one processor; and
   memory storing instructions that, when executed by the at least one processor, cause the at least one processor to perform operations comprising:
   identify a plurality of part of speech (PoS) tokens in an unstructured text; and
   determine a SVO chunked text directly from the plurality of PoS tokens using a machine learning chunker model, wherein the machine learning chunker model is trained on an SVO annotated training data, wherein the SVO annotated training data comprises a plurality of tokens, a plurality of corresponding PoS tags, and a plurality of corresponding SVO tags, the plurality of corresponding SVO tags comprises one or more of a subject tag, a verb tag, an object tag, or an object-subject tag, and the plurality of corresponding SVO tags is in beginningin-side-other (BIO) format, and wherein the SVO annotated training data is generated based on a plurality of corresponding span information for the plurality of tokens by for each of a plurality of PoS tokens in each of a plurality of sets of syntactically related PoS tokens in a sentence, detecting a span information for a PoS token and tagging the PoS token as a subject, a verb, an object, or an object-subject based on the span information and a pervious tagging of the PoS token.

7. The SVO chunked computing device of claim 6, wherein the instructions, when executed by the at least one processor, further cause the at least one processor to:
   extract a plurality of tokens from the input text, wherein each of the plurality of tokens comprises a word or a phrase; and
   determine a PoS tag for each of the plurality of tokens.

8. The SVO chunked computing device of claim 6, wherein each of the plurality of SVO chunked text is a set of semantically related PoS tokens and comprises a verb phrase and at least two of a subject phrase, an object phrase, or an object-subject phrase and the objectsubject phrase corresponds to an overlapping contiguous chunks that is an object phrase in an initial part of a sentence and a subject phrase in the subsequent part of the sentence.

9. The SVO chunked computing device of claim 6, wherein the machine learning chunker model is trained on one or more of:
   a non-overlapping SVO annotated training data comprising one set of subject, verb, and object in each of the sentences; or
   an overlapping SVO annotated training data comprising one or more sets of subject, verb, object, and object-subject in each of the sentences.

10. The SVO chunked computing device of claim 6, wherein the machine learning chunker model determines the plurality of SVO chunked text directly from the plurality of PoS tokens without a set of heuristics or a set of rules.

11. A non-transitory computer-readable medium having stored thereon instructions for extracting subject-verb-object (SVO) chunked text from unstructured text comprising executable code which, when executed by one or more processors, causes the one or more processors to:
 identify a plurality of part of speech (PoS) tokens in the unstructured text; and
 determine a plurality of SVO chunked text directly from the plurality of PoS tokens using a machine learning chunker model, wherein the machine learning chunker model is trained on a subject-verb-object (SVO) annotated training data, wherein the SVO annotated training data comprises a plurality of tokens, a plurality of corresponding PoS tags, and a plurality of corresponding SVO tags, the plurality of corresponding SVO tags comprises one or more of a subject tag, a verb tag, an object tag, or an object-subject tag, and the plurality of corresponding SVO tags is in beginninginside-other (BIO) format, and wherein the SVO annotated training data is generated based on a plurality of corresponding span information for the plurality of tokens by for each of a plurality of PoS tokens in each of a plurality of sets of syntactically related PoS tokens in a sentence, detecting a span information for a PoS token and tagging the PoS token as a subject, a verb, an object, or an object-subject based on the span information and a pervious tagging of the PoS token.

12. The non-transitory computer-readable medium of claim 11, wherein the executable code, when executed by the one or more processor, further causes the one or more processor to:
 extract a plurality of tokens from the input text, wherein each of the plurality of tokens comprises a word or a phrase; and
 determine a PoS tag for each of the plurality of tokens.

13. The non-transitory computer-readable medium of claim 11, wherein each of the plurality of SVO chunked text is a set of semantically related PoS tokens and comprises a verb phrase and at least two of a subject phrase, an object phrase, or an object-subject phrase and the object-subject phrase corresponds to an overlapping contiguous chunks that is an object phrase in an initial part of a sentence and a subject phrase in the subsequent part of the sentence.

14. The non-transitory computer-readable medium of claim 11, wherein the machine learning chunker model is trained on one or more of:
 a non-overlapping SVO annotated training data comprising one set of subject, verb, and object in each of the sentences; or
 an overlapping SVO annotated training data comprising one or more sets of subject, verb, object, and object-subject in each of the sentences.

15. The non-transitory computer-readable medium of claim 11, wherein the machine learning chunker model determines the plurality of SVO chunked text directly from the plurality of PoS tokens without a set of heuristics or a set of rules.

\* \* \* \* \*